Figure 1:
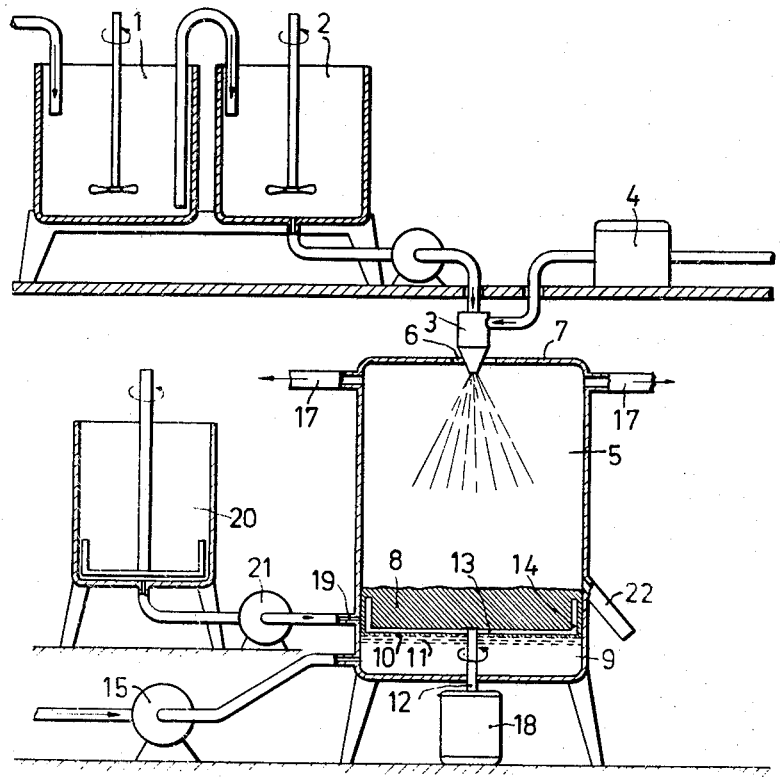
Figure 2:
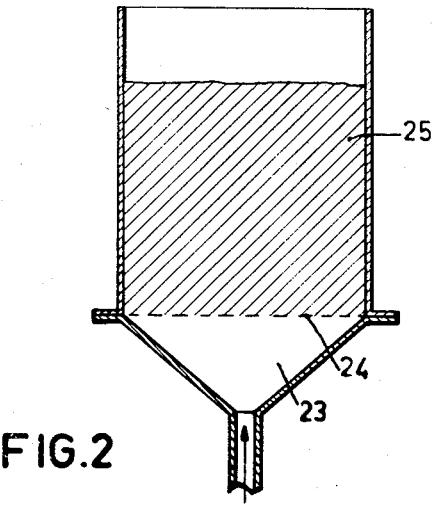

Aug. 24, 1965    A. B. GREVENSTUK ETAL    3,202,731
METHOD OF FORMING FREE FLOWING PARTICLES, CONTAINING
A BIOLOGICALLY VALUABLE SUBSTANCE
Filed April 3, 1961

INVENTOR
FRANÇOIS J.J.HOOGESTEGER.
ANTON B. GREVENSTUK.
BY
AGENT

United States Patent Office 3,202,731
Patented Aug. 24, 1965

3,202,731
METHOD OF FORMING FREE FLOWING PARTICLES, CONTAINING A BIOLOGICALLY VALUABLE SUBSTANCE
Anton Bernard Grevenstuk and Francois Johannes Jacobus Hoogesteger, both of Van Houtenlaan, Weesp, Netherlands, assignors to North American Philips Company, Inc., New York, N.Y., a corporation of Delaware
Filed Apr. 3, 1961, Ser. No. 100,456
Claims priority, application Netherlands, Apr. 7, 1960, 250,281
12 Claims. (Cl. 264—7)

This invention relates to a new and novel method of forming solid spherical particles from an aqueous emulsion or solution, containing a biologically valuable substance and a film-forming colloid and to a novel apparatus for use in such a method.

In the past attempts to form spherical particles from an aqueous emulsion or solution, containing a biologically valuable substance and a film forming colloid have not been fully successful in that the particles produced have been of irregular shapes or the processes have been unduly costly.

Thus according to one technique an emulsion which solidifies at room temperature and which contains a slowly solidifying substance is atomized into air at room temperature. However, such a technique has not proved a success because of the long time needed for the particles to solidify.

In order to overcome this difficulty it has been proposed to atomize such an emulsion into a hot gas. However, this technique has the drawbacks of requiring the use of an expensive drying tower and also resulting in porous, gas filled, irregularly shaped particles.

In another technique a vitamin emulsion is atomized into a cloud of a water absorbing powder such as starch or vegetable flour. This technique has the drawbacks of requiring regeneration of the water absorbing powder after each operation and resulting in particles containing large amounts of the water absorbing powder. In fact in one example of this technique such an emulsion is atomized into a vegetable flour which is kept into a fluidized state by an upwardly directed current of air. In this method no attempt is made to separate the flour from the solidified particles.

Finally, in the so-called double emulsion technique a warm aqueous vitamin emulsion containing an aqueous suspension of the vitamin in an aqueous solution of a film forming colloid is dispersed in a colder water-insoluble oil and after the resultant solidification of the vitamin emulsion the oil is removed by washing with suitable solvents and then drying the resultant spherical particles. This method has the disadvantages of being expensive and complicated due to the oil removing and drying steps and the need for regenerating the solvents and oil after each operation.

A principal object therefore of this invention is to provide a less expensive and less complicated method of causing aqueous emulsion or solutions, containing a biologically valuable substance and a film forming colloid into spherical particles of uniform appearance.

Another object of this invention is to provide an apparatus particularly suitable for carrying out the method of the invention. These and other objects of the invention will be apparent from the description that follows.

According to the invention the above-mentioned difficulties are eliminated by a new and novel method which comprises atomizing an aqueous solution or emulsion capable of slow gelation, forcing the resultant drops of said liquid to impinge upon a fluidized bed consisting initially of a powdered lubricant solid the particles of which are inert to said liquid and are nonabsorbent to said liquid and then of a mixture of said lubricant, solidified particles of said liquid and solidifying drops of said liquid said bed being kept at a temperature at which slow solidification of said liquid drops takes place removing the resultant solid spherical particles of said drops from said fluidized bed and separating said particles from the lubricant.

The solid particles of the fluidized bed are preferably kept in the fluidized state by a current of gas directed upwardly through it.

The temperature of the fluidized bed is kept at one at which slow gelation of the liquid drops takes place. The exact temperature employed depends in each instance upon the particular liquid to be solidified. Very good results are obtained by allowing liquid drops of a composition that is a liquid at high temperature and which slowly solidifies at lower temperatures to impinge upon a fluidized bed held at a temperature low enough to cause solidification of said liquid.

As the lubricant powder a substance which is inert to the aqueous solution or emulsion to be solidified, does not absorb any part of it and preferably which repells it should be employed. It is also important that the particle size of the lubricant powder be much smaller than that of the particles of the solidified liquid in order not only to serve as a lubricant but also to be easily carried along by the gas current directed through the fluidized bed.

When solidifying water containing drops, metal salts of higher fatty acids for example magnesium, calcium or aluminum stearate or palmitate have been formed to give good results. Especially good results have resulted when calcium stearate having an average particle size of about $5\mu$ is employed as the lubricant.

As the gas to be employed for fluidizing air at room temperature is preferred although other inert gases which may also be kept cooler then room temperature may also be used.

The present invention is of particular importance for the method of forming a dry, free-flowing preparation stable in air, the separate particles of which contain one or more biologically valuable substances, one or more antioxidants and/or synergists and in addition a film-forming colloid and a carbohydrate, in which the substances of which the particles are composed, are dissolved or dispersed in warm water in a concentration at which the warm mixture is fluid and slowly solidifies at room temperature, which fluid is then atomised at a temperature between 50° C. and 100° C., and the resultant drops are forced to impinge upon a fluidized bed according to the invention.

Examples of easily oxidisable, biologically valuable substance are vitamins, antibiotics, perfumes and proteins. Examples of such vitamins are the vitamins A, $D_2$, $D_3$ and E. Examples of such antibiotics which are of importance are penicillin and tetracycline derivatives, inter alia Aureomycin and bacitracin.

In preparing the liquid composition the biologically valuable substances may be dissolved in the aqueous fluid. If, however, the fluids are non-water-soluble but are oil-soluble, the aqueous liquid may contain the substance to be protected also in the form of a finely divided oil solution. For example, oil-in-water emulsions are prepared of the fat-soluble vitamins A, D and E. If desired, the oil contains the vitamins A and/or D, partially in a microcrystalline state.

To the aqueous fluid there may be added one or more anti-oxidants, synergists or complex formers, for example butylated hydroxyphenols, such as 4-methyl 2,6-ditertiary butylphenol, 2-and 3-tertiary butanol-4-hydroxyanisole nor-dihydroguaiaretic acid, alkyl gallates, such as the butyl, propyl, or octyl esters of gallic acid, ethylene diamine tetraacetic acid or the alkali metal salts thereof, also hydroguinone, vitamin C, citric acid, phosphoric acid, lecithin and the like. However, the aqueous phase must contain one or more substances which are capable of forming a solid protective coating enclosing biologically valuable substance after solification of the drops formed when atomising. Said substances are used in a concentration at which the fluid solidifies at room temperature. These substances may comprises the same mixtures of fium-forming colloids and carbohydrates which are commonly used in the known technologies in this field for example proteins such as gelatin, albumin and casein, gums, for example gum arabic, cellulose ethers or esters and pectin or mixtures thereof, with carbohydrates, for example glucose, saccharose, lactose, sorbitose and the like.

Very favourable results are obtained, for example, if gelatin and pectin are used as the film-forming substances and the carbohydrates, such as glucose, saccharose and lactose are used together, preferably with gelatin, to fill the hollow structure of the resultant dried gelated gelatin.

For atomising the fluid, various systems may be employed. In principles it is possible to atomise the fluid on a rotating disc as a result of which the fluid is scattered into very fine particles. The capacity of this type of atomiser as a rule is large, but a drawback is the formation of a spray cone having a large optical angle which would require a very wide fluid bed. Therefore a technique is required with which the fluid to be atomised is forced through a narrow aperture.

Very good results are obtained when using a two-phase atomiser in which a comparatively large quantity of air or another gas together with the fluid to be atomised is passed under excess pressure through the atomiser. The specific atomiser specifications employed and the desired particle size of the final product determine the viscosity of the fluid to be atomised.

Thus to obtain a particle size of from 100–600$\mu$ when using a two-phase atomiser having a cross-section at the discharge aperture of from 1 to 5 mms. at an atomising speed of 0.1–1 liter minute under an excess pressure of 0.2–1 atm. and with a gas excess pressure of 2–3.5 atmospheres, the viscosity of the fluid should be between 100 and 600 cp. The viscosity required of an aqueous fluid containing a film-forming colloid and other substances may be obtained either by choice of the total content of solid of the fluid mixture or by varying the concentration of film-forming colloid at a given content of solid.

For example when using an aqueous fluid containing gelatin, a carbohydrate and a biologically valuable substance, it will be preferable to obtain the highest possible content of solid because in this case the highest possible production capacity of ultimate dry preparation is obtained at a given atomising speed. The solidification time of the particles depends strongly on the gelatin content, so that the content of solid at a required viscosity of the fluid to be atomised is dependent upon this content.

The novel method of the invention has the advantages of producing spherical solid particles of substantially uniform size which do not adhere to the apparatus walls or to foreign substances. Because of the uniform size and shape of the particles produced the problems of quality control are eased and the miscibility with other substances such as food is improved.

Also the cost of production is decreased because this novel method particularly lends itself to a continuous production. Further, since the only other substance employed in the fluidized bed is a lubricant, expensive and complicated methods of separation are not required.

It is another important advantage of the method according to the invention that very soft particles may be formed, so that a minimum quantity of gelatin is sufficient and the total content of solids of the liquids may be very high without the viscosity becoming too high for atomising.

For example, mixtures may be used consisting of 65–45% of water and the rest, i.e., the solid constituents inclusive of possible oily substances, of 10–65% of a film-forming colloid, for example gelatin and/or pectin, 8–55% of one of more carbohydrates and 20–40% of a biologically valuable substance or a solution or dispersion thereof in a water immisicble fluid, for example oil. Good results were obtained in particular when the aqueous fluid contains 60–40% of water and the rest 25–65% of gelatin, 20–40% of carbohydrate and 20–40% an oxidisable substance or solutions or dispersions thereof in oil. If a composition of the emulsion is chosen so that the viscosity does not exceed 200 cp. at 70° C., particles of a particularly satisfactory spherical shape are obtained.

In order that the invention may be readily carried into effect it will now be more specifically described by reference to the following examples and the accompanying drawing, FIGURE 1 of which is a cross sectional view of an apparatus suitable for use in the method of the invention.

From the vessel 1 of FIGURE 1, the warm fluid is pumped to the atomiser 3 via the surge vessel 2. At the same time, via the filter 4, compressed air or another inert gas under excess pressure is conducted to the atomiser. The atomiser is preferably provided in a vertical position centrally over the cylindrical chamber 5 which contains the fluid bed, in such a manner within a round aperture 6 in the cover 7 that during atomising, gas which is outside the chamber 5 is sucked in or blown in along the atomiser mouth. As a result of this any lubricant conducted along with the fluidising gas current is prevented from reaching the atomiser aperture and being included in the still thin fluid drops.

The atomiser 3 is located at such a distance from the surface of the fluid bed 8 that the fluidising state in the upper layers of the fluid bed is not disturbed by the atomisation. In the case of a two-phase atomiser as shown in FIGURE 1 for example the distance from the atomiser mouth to the fluid bed surface preferably is not chosen smaller than 1.5 m. if the diameter of the atomiser aperture is 1–5 mm. and 100–200 liter of gas are blown through per minute. By this choice also the minimum cross-section of the chamber 5 is determined so that the number drops atomised against the wall is kept at a minimum. At a distance of 1.5 m. between the atomiser and the fluid bed surface, a chamber of a cross section of at least 1.5 m. preferably employed.

The fluidised bed 8 consists of a mixture of lubricant and solidifying and already solidified preparation particles.

In order to obtain a uniform degree of fluidisation throughout the fluidised bed it is preferable that there be a homogeneous distribution of the kinetic energy of the fluidising gas current before this current reaches the powder mass.

In the device shown in FIGURE 1, this is achieved by providing a sieve system between the gas supply chamber 9 and the powder mass, consisting of an upper layer which is formed by a textile fabric, for example cotton cloth 10, and one or more lower layers 11 formed by a metal gauze having very fine apertures, for example electrolytic nickel gauze having apertures of 40–50$\mu$ diameter. Such a sieve system turned out to give not only a very good distribution of the gas current, but in addition had a low resistance to the flow of this current.

When using such a device it was possible to maintain a very good fluidisation state in a fluid bed having a cross-section of 1.5–2 m. and a height of from 20–30 ms.

It is of importance to keep the quantity of gas passing through as small as possible so as to prevent atomisation of the lubricant. Therefore, a stirrer 12 is preferably provided in the fluid bed, which stirrer is driven by a motor 18 provided below the pressure chamber. When using a stirrer, in which, as shown in the figure, horizontal blade-shaped arms 13, are provided at an angle of for example 45° to the bottom of the sieve and the ends of which are provided with vertical blades 14 at an angle of approximately 45° to the sides of the wall, it is possible to restrict the gas current which is necessary for a good fluidisation without the stirrer, to ¼ of this flow rate.

When using air as fluidising gas, a simple blower 15 may be used which drives the air through the mass at a linear speed of from 2–5 cms./sec. The air is carried off through the apertures 7 in the top of the fluidisation chamber.

It is possible to perform the method according to the invention so that the fluidisation chamber contains lubricant only which is fluidised after which the preparation is atomised into it. It turned out that in this case a minimum quantity of lubricant is necessary because at a given mixing ratio of lubricant and preparation particles, preparation particles are atomised in the bed after some time and no satisfactory fluidisation condition can be maintained any longer. This minimum quantity of lubricant turned out to be for example 10–15% by weight of calcium stearate of the total powder mass.

In a continuous method according to the invention, an amount of the solidified preparation particles is conducted away via an exhaust 22 equal to the amount of drops which is supplied to the bed by the atomizer. At the same time, the concentration of the lubricant in the bed is kept constant by continuously adding, via the aperture 19 and by means of a pump 21, as much lubricant from a storage vessel 22 as is withdrawn with the preparation from the bed, via the exhaust 22. In such a continuous method, the time required for a sufficient solidification of the particles in the fluid bed can, in a simple manner, be controlled by choice of the atomising rate. The solidified water containing preparation particles mixed with lubricant, which leave the fluid bed via the exhaust 22, are caught, for example, in a storage vessel and then dried batch-wise. For example, the particles are kept in a rotating drum for some hours at a temperature of from 30–65°, while air is blown through this drum with which the lubricant particles are conducted away and collected in a dust collecting devices.

In the following examples, specific forms of the use of the present invention are described for the production of dry and free-flowing, air-stable vitamin A preparations. In these examples the quantity of the constitutents are always recited in parts by weight.

*Example I*

25 parts of gelatin and syrup containing 45 parts of glucose were dissolved in a total amount 67 parts of water at 70° C. 17 parts of vitamin A-acetate heated at 70° C. were added to this solution as well as an antioxidant consisting of 13 parts of ionol and 0.1 part of butyl hydroxy anisol. The mixture was homogenised. The viscosity of the resulting emulsion was 120 cp.

The fluid was atomised through a so called 2-phase atomiser having an emulsion spray aperture of 2.8 mms. diameter. The quantity of fluid atomised per minute was from 500–600 ml. After a falling height of 1.70 m., the drops were caught in a fluid bed which initially consisted of air-fluidised calcium stearate. The final composition in the fluid bed was: 5 parts of vitamin A pills: 1 part of stearate. The resulting mixture was transferred to a rotating drier in which, at an air temperature of 40° C., drying and the separation of the vitamin A pills from the stearate was simultaneously performed.

*Example II*

In the manner as described in Example I, an emulsion was prepared of the following composition:

127 parts of $H_2O$
40 parts of gelatin
30 parts of glucose
23.3 parts of vitamin A-palmitate
6.7 parts of 4-methyl 2,6-ditertiary butylphenol Viscosity at 70° C.: 125 cp.

This emulsion was atomised in a fluid bed with magnesium stearate as lubricant, after which the solidified preparation was dried at 50° C. in a rotating drum in the same manner as in Example I.

*Example III*

An emulsion of the composition:

60 parts of gelatin
10 parts of glucose
16 parts of vitamin A-acetate
14 parts of ionol
165 parts of water the viscosity of which at 70° C. was 120 cp. was atomised as described in Example I in a fluid bed with Ca-stearate as lubricant. The mixture of solidified preparation particles and lubricant was transferred to a vessel having a bottom which was not permeable to the preparation particles but which was permeable to air, through which bottom an air current of 50° C. was conducted fluidising the powder. After the pills had been dried sufficiently in it, the lubricant was separated from the preparation particle by means of a strong current of air.

The preparations obtained according to the above described examples consisted of spherical pills having a diameter varying between 100 and 600μ, substantially unmixed with smaller or larger particles. The stearate content of the resultant pills was less than 5%.

While we have described our invention in connection with specific embodiments and applications, other modifications thereof will be readily apparent to those skilled in this art without departing from the spirit and scope of the invention as defined in the appended claims.

What is claimed is:

1. A method of manufacturing solid, air-stable free flowing, spherical particles each particle having a center portion containing an air-oxidizable substance and at least one antioxidant and an outer portion containing a film-forming colloid and a carbohydrate, said method comprising the steps, forming in warm water an aqueous emulsion of said above-mentioned ingredients in a concentration such that said mixture slowly hardens at room temperature, atomizing said aqueous emulsion at a temperature between about 50° C. and 100° C. into a gas having a temperature low enough to cause the resultant fluid drops to slowly harden, forcing the resultant drops to impinge upon a fluidized bed consisting initially of a non-water absorbent powdered lubricant solid and then of a mixture of said solid lubricant powder, solidified spherical particles formed from said fluid drops and solidifying drops formed from said fluid drops, said bed kept in the fluidized state by means of an upwardly directed gas, said gas having a temperature sufficiently low to cause the fluid drops to solidify, withdrawing the resultant solid spherical particles from the fluidized bed, removing the lubricant from said particles and drying said particles.

2. The method of claim 1 wherein the colloid is selected from the group consisting of gelatin and pectin, glucose, dextrine and the carbohydrate is selected from the group consisting of saccharose, lactose, glucose and dextrine.

3. The method of claim 1 wherein the atomized fluid consists of 65–45% by weight of water and the remainder of which consists of 10–65% of a film-forming colloid, 8–55% of at least one carbohydrate and 20–40% of a biologically valuable substance.

4. The method of claim 3 wherein the fluid consists of 60–40% by weight of water and the remainder contains 25–65% of gelatin, 20–40% of a carbohydrate and 20–40% of an oxidizable biologically valuable substance in an oil.

5. The method of claim 4, wherein the viscosity of the fluid to be atomised lies between 100 and 600 cp. at 70° C.

6. The method of claim 4, wherein an emulsion is atomised having a viscosity between 100 and 200 cp. at 70° C.

7. The method of claim 1 wherein a metal salt of a higher fatty acid is used as the lubricant.

8. The method of claim 1 wherein the lubricant is calcium stearate having an average particle diameter of approximately $5\mu$.

9. The method of claim 1 wherein solidified spherical particles formed from the slowly hardening composition is continuously withdrawn from the fluidized bed as the drops are continuously forced to impinge on said bed.

10. The method of claim 1 wherein the fluidisation of the solids is obtained by means of a current of air at room temperature.

11. The method of claim 1 wherein the fluid bed the height is smaller than the diameter of the surface.

12. The method of claim 9 wherein the fluidized bed contains from 10%–15% of calcium stearate.

References Cited by the Examiner

UNITED STATES PATENTS

| | | | |
|---|---|---|---|
| 2,217,711 | 10/40 | Shappirio. | |
| 2,411,897 | 12/46 | Sahyun | 165—65 |
| 2,561,395 | 7/51 | Marshall | 117—100 |
| 2,836,902 | 6/58 | North | 34—57 |
| 2,861,024 | 11/58 | Silver | 167—82 |
| 2,887,724 | 5/59 | Bettes | 264—14 |
| 2,987,444 | 6/61 | Allardice | 167—82 |
| 3,070,837 | 1/63 | Loertscher et al. | 264—14 |

FOREIGN PATENTS

| | | |
|---|---|---|
| 161,054 | 2/55 | Australia. |
| 708,160 | 4/54 | Great Britain. |

OTHER REFERENCES

American Pharmacy, edited by Lyman, J. B. Lippincott Co., Philadelphia, 1947, pp. 219 and 220.

ALEXANDER H. BRODMERKEL, *Primary Examiner.*

RICHARD D. NEVIUS, *Examiner.*

UNITED STATES PATENT OFFICE
CERTIFICATE OF CORRECTION

Patent No. 3,202,731　　　　　　　　　　　　　　August 24, 1965

Anton Bernard Grevenstuk et al.

It is hereby certified that error appears in the above numbered patent requiring correction and that the said Letters Patent should read as corrected below.

Column 6, line 70, strike out "glucose, dextrine"; column 7, line 26, for "the fluid" read -- in the fluid --.

Signed and sealed this 5th day of July 1966.

(SEAL)
Attest:

ERNEST W. SWIDER
Attesting Officer

EDWARD J. BRENNER
Commissioner of Patents